(12) United States Patent
Wolff et al.

(10) Patent No.: US 9,553,443 B2
(45) Date of Patent: Jan. 24, 2017

(54) INVERTER AND POWER SYSTEM WITH FUSE PROTECTION

(71) Applicant: General Electric Company, Schenectady, NY (US)

(72) Inventors: Jeffrey John Wolff, Lawrence Park, PA (US); Jason Daniel Kuttenkuler, Jacksonville, FL (US); Alvaro Jorge Mari Curbelo, Munich (DE); Henry Todd Young, Lawrence Park, PA (US)

(73) Assignee: General Electric Company, Schenectady, NY (US)

(*) Notice: Subject to any disclaimer, the term of this patent is extended or adjusted under 35 U.S.C. 154(b) by 403 days.

(21) Appl. No.: 14/364,201

(22) PCT Filed: Dec. 18, 2012

(86) PCT No.: PCT/US2012/070344
§ 371 (c)(1),
(2) Date: Jun. 10, 2014

(87) PCT Pub. No.: WO2013/101549
PCT Pub. Date: Jul. 4, 2013

(65) Prior Publication Data
US 2014/0339890 A1 Nov. 20, 2014

Related U.S. Application Data

(60) Provisional application No. 61/581,346, filed on Dec. 29, 2011.

(51) Int. Cl.
*H02J 3/38* (2006.01)
*H02H 7/122* (2006.01)
(Continued)

(52) U.S. Cl.
CPC .......... *H02H 7/1225* (2013.01); *B60L 3/0046* (2013.01); *B60L 3/0061* (2013.01);
(Continued)

(58) Field of Classification Search
CPC ........................................................ H02J 3/38
See application file for complete search history.

(56) References Cited

U.S. PATENT DOCUMENTS

| 4,063,302 A | 12/1977 | Donig et al. |
| 6,456,186 B1 | 9/2002 | Oglesbee |

(Continued)

FOREIGN PATENT DOCUMENTS

| CN | 201142571 Y | 10/2008 |
| CN | 201260073 Y | 6/2009 |

(Continued)

OTHER PUBLICATIONS

Dos Santos et al., "Short Circuit and Overcurrent Protection of IGCT-Based Three-Level NPC Inverters", IEEE 35th Annual Power Electronics Specialists Conference, vol. No. 4, pp. 2553-2558, 2004.

(Continued)

*Primary Examiner* — Robert Deberadinis
(74) *Attorney, Agent, or Firm* — John A. Kramer; Global Patent Operation

(57) ABSTRACT

A power conversion system includes a bus bar, a switch coupled to the bus bar and configured to receive a DC input voltage from a voltage source through the bus bar, and a parallel fuse system. The parallel fuse system may be disposed on the bus bar in series with the voltage source and the switch. The parallel fuse system includes two or more parallel fuses, and may be configured for an inductance imbalance between the fuses, such that there is an asymmetric flow of currents through the fuses when the power (Continued)

conversion system is in operation. For the inductance imbalance, for example, the fuses may be positioned asymmetrically with regard to a shortest conductive path from the voltage source to the switch.

22 Claims, 5 Drawing Sheets

(51) Int. Cl.
*B60L 3/00* (2006.01)
*B60L 3/04* (2006.01)
*H02M 7/537* (2006.01)

(52) U.S. Cl.
CPC ............... *B60L 3/04* (2013.01); *H02M 7/537* (2013.01); *B60L 2200/26* (2013.01); *B60L 2200/32* (2013.01); *B60L 2200/36* (2013.01)

(56) References Cited

U.S. PATENT DOCUMENTS

| | | | |
|---|---|---|---|
| 7,339,803 | B2 | 3/2008 | Nojima |
| 8,112,853 | B2 | 2/2012 | Yoshinaga et al. |
| 2009/0291594 | A1 | 11/2009 | Donth et al. |

FOREIGN PATENT DOCUMENTS

| | | | |
|---|---|---|---|
| CN | 201393056 | Y | 1/2010 |
| CN | 101814728 | A | 8/2010 |
| GB | 2399465 | A | 9/2004 |
| JP | 60111342 | U | 7/1985 |
| JP | 059191 | U | 2/1993 |
| JP | 09147733 | A | 6/1997 |
| JP | 11144603 | A | 5/1999 |
| JP | 2000295835 | A | 10/2000 |
| JP | 2007159174 | A | 6/2007 |
| JP | 2008141886 | A | 6/2008 |
| JP | 2008295227 | A | 12/2008 |
| JP | 2009152151 | A | 7/2009 |
| JP | 2009266494 | A | 11/2009 |
| MX | PA06011544 | A | 12/2006 |
| WO | 2010102100 | A2 | 9/2010 |

OTHER PUBLICATIONS

International Search Report and Written Opinion issued in connection with corresponding PCT Application No. PCT/US2012/070344 dated Jul. 12, 2013.

Unofficial English translation of Office Action issued in connection with corresponding JP Application No. 2014-549202 on Jun. 30, 2015.

200

400

INVERTER AND POWER SYSTEM WITH FUSE PROTECTION

This application claims priority to U.S. Provisional Application Ser. No. 61/581,346, filed Dec. 29, 2011.

BACKGROUND

Field

Embodiments of the invention relate to power electronics systems. Other embodiments relate to inverters and other power electronics systems for converting one voltage waveform to another, e.g., for driving a load.

Discussion of Art

An inverter may be used to provide power to off-highway vehicles and other vehicles by transforming direct current (DC) into alternating current (AC). An off-highway vehicle may be a vehicle that is not for use on roads designated for primary use by automobiles, and may include one or more engines or motors for energy generation and propulsion. Examples of off-highway vehicles include locomotives and other rail vehicles, marine vessels, mining haul trucks, other heavy mining or construction equipment, and the like.

In the event of a fault or failure of an inverter, multiple fuses can be used to prevent further damage to the remainder of a power conversion system. Multiple fuses are typically used to protect each phase of a power conversion system. However, if more than two fuses are used for circuit protection, the effective amount of energy required to melt the fuses (for circuit protection) may be higher than is desirable for a given application. Additionally, the fuses are typically located in the path of failure material, such as debris or plasma. In the event of a fault or failure of an inverter, fuses within the system may be inoperable due to the presence of plasma. Thus, the fuses may be unable to protect the power conversion system.

BRIEF DESCRIPTION

In an embodiment, a power conversion system (e.g., for converting one form of electrical power to another form of electrical power on an off-highway vehicle or other vehicle) comprises a bus bar (e.g., a laminated bus bar), and a switch (e.g., a semiconductor power switch) coupled to the bus bar and configured to receive a DC input voltage from a voltage source through the bus bar. The power conversion system further comprises a parallel fuse system disposed on the bus bar in series with the voltage source and the switch. The parallel fuse system comprises two or more parallel fuses (the two or more fuses are electrically connected in parallel), and is configured for an inductance imbalance between the fuses during operation of the power conversion system.

In operation, in an embodiment, the inductance imbalance between the fuses results in an unbalanced asymmetric current flow through the fuses. That is, if the two or more fuses are the same type of fuse, the amounts of current flowing through the fuses are different from one another. This results in a lower amount of energy being required to heat up and melt the fuse elements (lower effective melting $I^2t$), relative to the same fuses in a similar system but without the inductance imbalance, which can be beneficial for enhancing system protection especially when operating at lower voltages. In embodiments, the parallel fuse system is configured for the inductance imbalance by virtue of the two or more fuses being positioned asymmetrically with regard to a shortest conductive path from the voltage source to the switch, e.g., the fuses have different electrical path lengths.

In other embodiments, the parallel fuse system includes one or more inductors for establishing the inductance imbalance. In other embodiments, the parallel fuse system includes an active circuit(s) for establishing the inductance imbalance.

Other aspects relate to power conversion systems for off-highway vehicles or other vehicles. In one embodiment, a vehicle comprises a bus bar, a power converter, and a parallel fuse system. The power converter (e.g., an inverter) comprises plural switches, at least some of which are coupled to the bus bar. The parallel fuse system is disposed on the bus bar and comprises two or more fuses electrically connected in parallel. The parallel fuse system is electrically connected in series with the power converter and a power source. The fuses of the parallel fuse system are located below and laterally offset from the plural switches of the power converter, such that debris from the switches, if falling vertically downwards, does not encounter the fuses, and debris from the fuses, if falling downwards (vertically or at an angle), does not encounter the switches. ("Located below" is relative to at least when the vehicle is in contact with a level surface for motive operation of the vehicle.)

Another embodiment relates to a power conversion system comprising a power converter and a parallel fuse system. The power converter comprises six switches, which include three upper switches coupled to a first bus bar and three lower switches coupled to a second bus bar. (Upper and lower are labels, and not necessarily meant to imply relative positioning; however, in embodiments, the upper switches are positioned above the lower switches.) The three upper switches are configured to receive a DC positive input voltage from a voltage source through the first bus bar and the three lower switches are configured to receive a DC negative input voltage from the voltage source through the second bus bar. The parallel fuse system is disposed on the first bus bar or on the second bus bar, and is electrically connected in series with the voltage source and the six switches. The parallel fuse system comprises three parallel fuses. The parallel fuse system is configured for an inductance imbalance between the parallel fuses during operation of the power converter.

DRAWINGS

These and other features, aspects, and advantages of the invention will become better understood when the following detailed description is read with reference to the accompanying drawings in which like characters represent like parts throughout the drawings, wherein.

DETAILED DESCRIPTION

Figure 1:
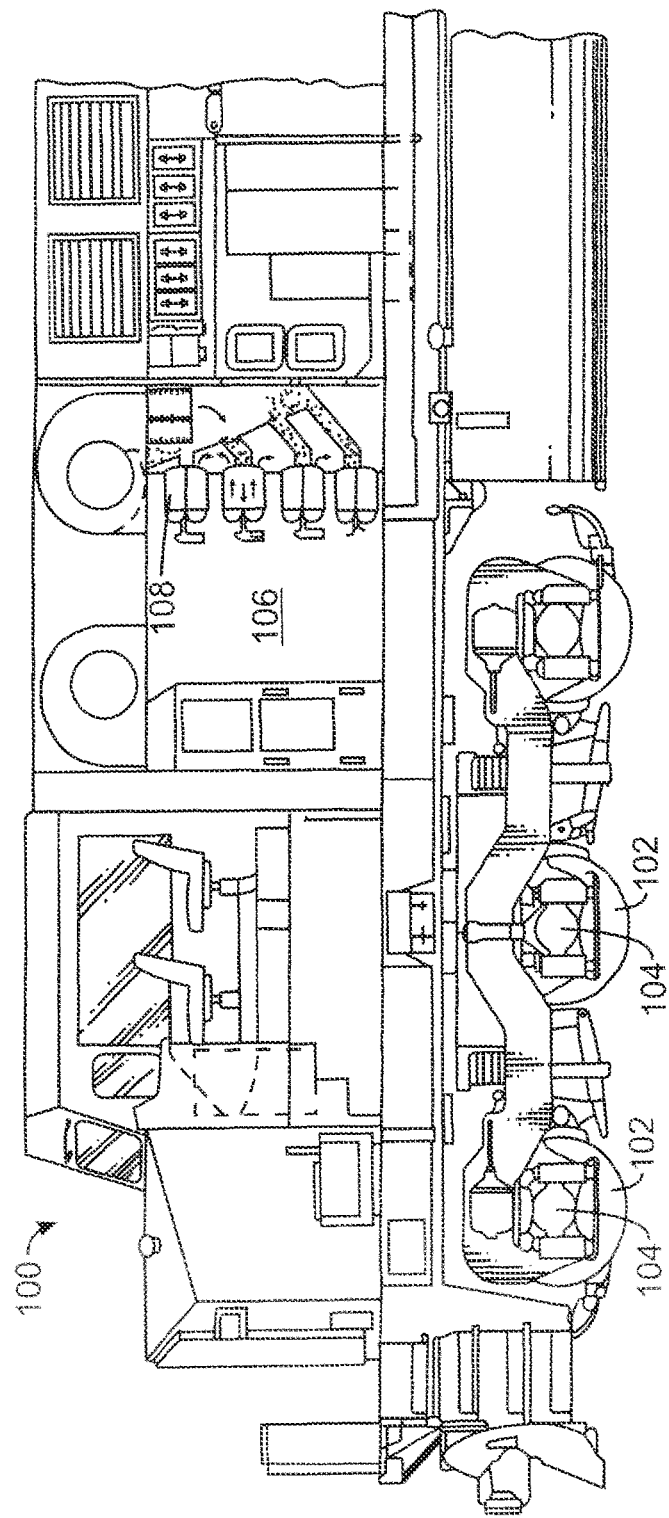
FIG. 1 is a block diagram of a diesel-electric locomotive in accordance with embodiments.

Space limitations are often a major constraint when performing electric power conversion within off-highway vehicles, such as a locomotive, or other vehicles. Typically, a train may be pulled or pushed by one or several locomotives. In such a scenario, a power conversion system may reside within the limits of the locomotive body. Alternatively, trains may be propelled by multiple, smaller propulsion units placed along the train, also known as distributed propulsion. Both types of power conversion systems have several different advantages and disadvantages, while also incorporating different design challenges. For ease of description, power conversion systems are described as residing within the confined space of a locomotive body or other off-highway vehicle or other vehicle.

Embodiments of the invention generally relate to fuse protection of electronic power inverters and other power converters. (A power converter is a device configured to convert electrical power from one form to another, e.g., DC to single-phase AC, DC to three-phase AC, DC to DC, or the like.) In an embodiment, a power conversion system (e.g., for an off-highway vehicle or other vehicle) comprises a laminated bus bar or other bus bar, and a semiconductor power switch or other switch coupled to the bus bar and configured to receive a DC input voltage from a voltage source through the bus bar. (In embodiments, there are plural semiconductor power switches or other switches coupled to the bus bar, which are controllably switched on and off for a power conversion operation.) The power conversion system further comprises a parallel fuse system disposed on the bus bar in series with the voltage source and the switch. The parallel fuse system comprises two or more fuses that are electrically connected in parallel. The parallel fuse system is configured for an inductance imbalance between the fuses during operation of the power conversion system. The inductance imbalance between the fuses results in the current that flows through the two or more parallel fuses during operation of the power conversion system being unbalanced/asymmetric. That is, if the two or more fuses are the same type of fuse (e.g., same model/part number and capacity), as will typically be the case in a given application, the amounts of current flowing through the fuses are different from one another. This results in a lower amount of energy being required to heat up and melt the fuse elements (lower effective melting $I^2t$), relative to the same fuses in a similar system but without the inductance imbalance, which can be beneficial for enhancing system protection especially when operating at lower voltages. More specifically, with the inductance imbalance, one of the fuses sees a smallest inductance, which results in reaching the melting $I^2t$ earlier than the other fuses, which tends to reduce the melting $I^2t$ of the "equivalent fuse."

In embodiments, multiple fuses are used in parallel to provide protection for an inverter or other power converter. As a result of the fuses being arranged in parallel, a laminated bus bar (to which the fuses and switches are connected) may have fewer layers than a similar system with a laminated bus bar but without multiple fuses in parallel.

FIG. 1 is a block diagram of a diesel-electric locomotive in accordance with embodiments. The locomotive, which is shown in a simplified, partial cross-sectional view, is generally referred to by the reference number 100. A plurality of traction motors, not visible in FIG. 1, are located behind drive wheels 102 and coupled in a driving relationship to axles 104. A plurality of auxiliary motors, not visible in FIG. 1, are located in various locations on the locomotive, and coupled with various auxiliary loads like blowers or radiator fans. The motors may be alternating current (AC) electric motors. As explained in detail below, the locomotive 100 may include a plurality of electrical power converters (e.g., inverter circuits) for controlling electrical power to the motors. Although a locomotive is shown in FIG. 1 as one example of a vehicle to which embodiments of the invention are applicable, other embodiments are applicable to other off-highway vehicles and other vehicles generally.

Figure 2:
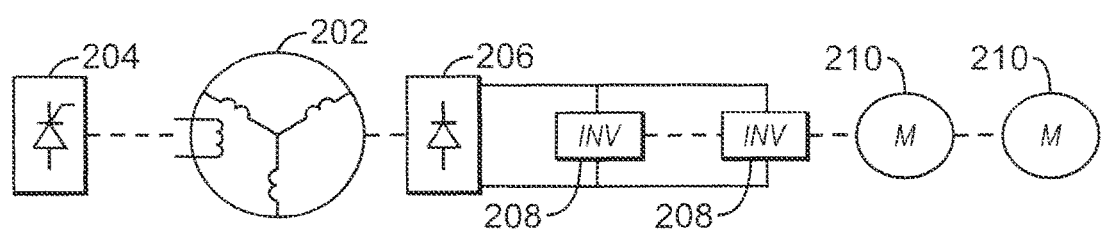
FIG. 2 is a block diagram of a power conversion system in accordance with embodiments.

FIG. 2 is a block diagram of a vehicle power system, in accordance with embodiments. The vehicle power system, which is generally referred to by the reference number 200, may be used to control AC power to a load, for example, one or more motors for an off-highway vehicle such as the locomotive 100 (FIG. 1). The vehicle power system 200 may include an alternator 202 driven by an on-board internal combustion engine such as a diesel engine (not shown). The power output of the alternator 202 is regulated by field excitation control indicated by a field control 204. Electrical power from the alternator 202 is rectified by a rectifier 206, and coupled to one or more inverters 208 or other power converters. The inverters 208 may use high power semiconductor switches to convert the DC power to AC power with variable frequency and variable voltage amplitude for application to one or more AC motors 210. Examples of high-power semiconductor switches that may be employed in an inverter or other power converter include insulated gate bipolar transistors (IGBTs), reverse-conducting IGBTs, and bi-mode insulated gate transistors (BIGTs), among others. Although two motors are shown, the locomotive or other vehicle may include four to six AC electric motors, each controlled, for example, by an individual inverter.

Referring again to FIG. 1, electrical power circuits are at least partially located in an equipment compartment 106. The control electronics for the inverters 208 (FIG. 2) and the field control 204 (FIG. 2) as well as other electronic components may be disposed on circuit boards held in laminated bus bars or other bus bars in the equipment compartment 106. Within the equipment compartment 106, the inverters or other power converters, such as inverter 208 (FIG. 2), used in the power conversion may be mounted to air-cooled heat sinks 108.

As noted above, the inverters 208 used to generate the AC waveform may include high-power semiconductor switches. During a switch fault such as a shoot-through fault, the current across the switch can increase rapidly. To limit the damage resulting from a shoot-through fault, the inverter modules can be configured so that they are protected by fuses. In accordance with embodiments, multiple inverters may be protected by two or more fuses in parallel. The parallel fuse system may be located below the inverter modules, such that the location of the parallel fuse system provides inverter isolation in the event of a fault.

Figure 3:
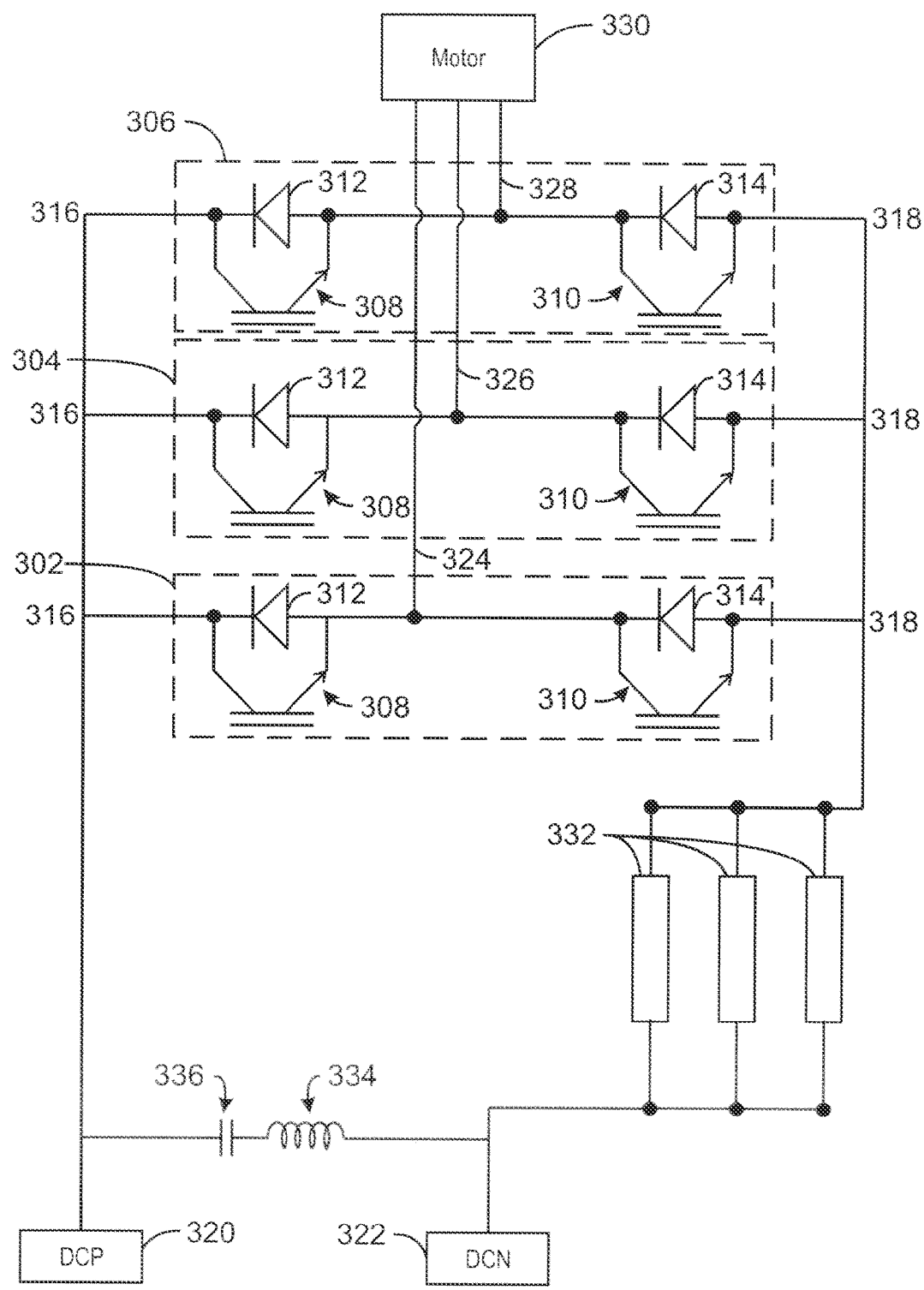
FIG. 3 is a circuit diagram of a power conversion system with fuse protection in accordance with embodiments.

FIG. 3 is a circuit diagram of a power conversion system 300 with fuse protection in accordance with embodiments. The power conversion system 300 of FIG. 3 includes a first leg 302, a second leg 304, and a third leg 306. As shown in FIG. 3, each leg 302, 304, and 306 includes a pair of switches 308 and 310. The switches may be formed by using semiconductors such as IGBTs, BIGTs, and the like.

The switches 308 are referred to herein as upper switches 308. Also, the switches 310 are referred to herein as lower switches 310. (As noted above, the terms upper and lower are labels, and not necessarily meant to imply relative positioning; however, in embodiments, the upper switches are positioned above the lower switches.) Diodes, referred to herein as upper diodes 312, are disposed in anti-parallel across the collector and emitter of the upper switches 308 within each leg 302, 304, and 306. Other diodes, referred to herein as lower diodes 314, are disposed in anti-parallel across the collector and emitter of the lower switches 310 within each leg 302, 304, and 306. The diodes 312 and 314 provide a conductive path for freewheeling current, which is current that is generated due to the inductance of the circuit and the load when a current-conducting switch is turned off. The upper diodes 312 provide a conductive path for free-wheeling current that may result when the lower switches 310 are switched off. The lower diodes 314 provide a conductive path for freewheeling current that may result when the upper switches 308 are switched off. The upper switches 308 and lower switches 310 are disposed in series between an upper rail 316 and lower rail 318. The upper rail 316 may be connected to a voltage source such as a DC positive (DCP) voltage source 320 while the lower rail 318 may be connected to a voltage source such as a DC negative (DCN) voltage source 322. In embodiments, each switch 308 and 310 and its corresponding diode 312 and 314 within each leg 302, 304, and 306 is disposed within its own separate switch housing, such as a high voltage planar base module installed on top of a copper heat sink inside of a glastic housing. In an embodiment, the switches 308 and 310 and the diodes 312 and 314 are disposed within the same housing for each leg 302, 304, and 306.

Each leg 302, 304, and 306 generates a different output phase to feed a three phase motor. The first leg 302 produces a first output phase 324, while the second leg 304 produces a second output phase 326 and the third leg 306 produces a third output phase 328. The three output phases 324, 326, and 328 are fed to a three-phase motor 330. For the sake of simplicity, three inverter legs 302, 304, and 306 for feeding a three-phase motor 330 are shown. However, it will be appreciated that a power conversion system in accordance with embodiments may include two, three, or more inverter legs, each providing an output AC waveform (or other waveform) for a particular phase of a multiphase motor or other motor or other load.

The power conversion system 300 also includes a parallel fuse system, which includes two or more fuses 332. (Three fuses are shown in the embodiment of FIG. 3.) The parallel system of fuses 332 may be disposed in series with the upper rail 316 or the lower rail 318. Furthermore, although not shown in FIG. 3, both the upper rail 316 and the lower rail 318 could each have its own parallel system of fuses 332. The switches 308 and 310 may be connected to other clamping circuitry not shown in FIG. 3. Under certain fault conditions, it may be possible for the voltage across the emitter and collector of the switches 308 or 310 to build to an excessive level that could damage the switches. For example, a shoot through fault can occur if both switches 308 and 310 within one leg 302, 304, or 306 are turned on at the same time, creating a short circuit between the upper rail voltage 316 and the lower rail voltage 318 through the two switches 308 and 310. To limit the damage to any of the components of leg 302, 304, or 306, fuses 332 will "blow," or melt, in order to prevent the current from overloading the circuitry. Each switch 308 and 310 is also coupled to an inductor at reference number 334 and a capacitor bank at reference number 336. The capacitor bank may be a common capacitor bank through a low inductance bus bar.

Figure 4:
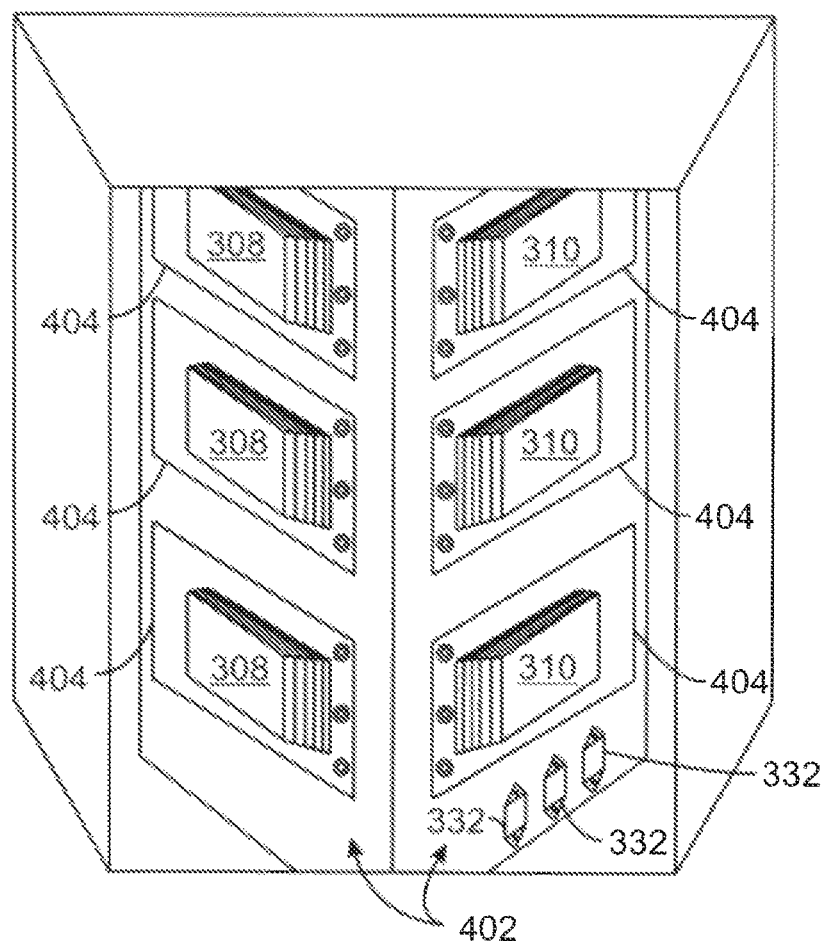
FIG. 4 is a diagram showing a portion of a power conversion system in accordance with embodiments.

FIG. 4 is a diagram showing a portion of a power conversion system 400 in accordance with embodiments. The power conversion system 400 includes a laminated bus bar 402. The laminated bus bar provides a conductive path for the DC voltage that feeds the various electrical components coupled to the bus bar 402, such as the inverter legs 302, 304, and 306 (FIG. 3). For example, a switch 308 and a switch 310 on the bus bar 402 may be considered one leg of a power conversion system, such as the power conversion system 300 (FIG. 3). It will be appreciated that a power conversion system in accordance with embodiments may include any suitable number of laminated bus bars depending on the design considerations for a particular implementation. Additionally, although not shown, the laminated bus bar 402 may have a common capacitor bank through a low inductance vertical bus bar. Further, it will be understood that there are various voltage sources and current carrying cables not displayed in FIG. 4.

The laminated bus bar 402 contains phase islands 404. A phase island is a layer of the laminated bus bar 402 that creates a connection between the output of each phase, such as the output from leg 324, 326, and 328 (FIG. 3) and the motor 330 (FIG. 3). Each phase island 404 may be connected to a high voltage planar base module installed on top of a copper heat sink inside of a glastic housing. The glastic housing connected to each phase island 404 may contain a switch such as switches 308 and 310 (FIG. 3), further displayed in FIG. 4. The switches 308 and 310 may be coupled to a laminated bus bar 402 and configured to receive a DC input voltage from a voltage source through the laminated bus bar 402. Each switch 308 and 310 operates as a controlled transistor when current flows in one direction or as a diode when current flows in the opposite direction. As shown in FIG. 3, switches 308 and switches 310 are used to transform direct current (DC) into alternating current (AC) output to a motor. The parallel fuse system that includes fuses 332 (FIG. 3) may be disposed on the laminated bus bar 402 in series with the voltage source and the switches. Thus, fuse protection is provided for the entire system and not on a per-phase basis.

As noted, the parallel fuse system includes two or more fuses electrically connected in parallel. In embodiments, the parallel fuse system is configured for an inductance imbalance between the fuses during operation of the power conversion system. In embodiments, the parallel fuse system is configured for the inductance imbalance by virtue of the two or more fuses being positioned asymmetrically with regard to a shortest conductive path from the voltage source to the switch, e.g., the fuses have different electrical path lengths. In other embodiments, the parallel fuse system includes one or more inductors (e.g., inductor circuit elements connected in series with the fuses) for establishing the inductance imbalance. In other embodiments, the parallel fuse system includes one or more active circuits for establishing the inductance imbalance.

The fuses 332 may be located at the bottom of the bus bar in order to provide fuse protection to each inverter. As shown in FIG. 4, when the power conversion system is installed in a vehicle for use, the fuses 332 are located below the switches 310. The switches 308 and 310 are provided protection through the use of the parallel fuse system. A circuit is at risk for damage when a fault or failure has caused excess current to flow through the circuit, as in the case of a shoot-through fault described above. When current flows through the fuse that is higher than the fuse's current rating, the fuse may provide protection to the circuit by "blowing" (melting an element within the fuse). The element may be surrounded by a filler material and is enclosed by the fuse body. A blown fuse protects the electrical circuit by opening so that no further damage to the circuit occurs.

The amount of energy it takes within a circuit to blow a fuse is known as the ampere squared seconds ($I^2t$) specification for that fuse. The $I^2t$ specification of the fuse is a measure of the energy that will cause the fuse to blow, which depends on the amplitude of the current as well the time duration of the current. The melting $I^2t$ specification is also the minimum $I^2t$ specification needed to melt the fuse element. In embodiments, the parallel fuse system lowers the combined melting $I^2t$ specification of the parallel fuse system.

Figure 5:
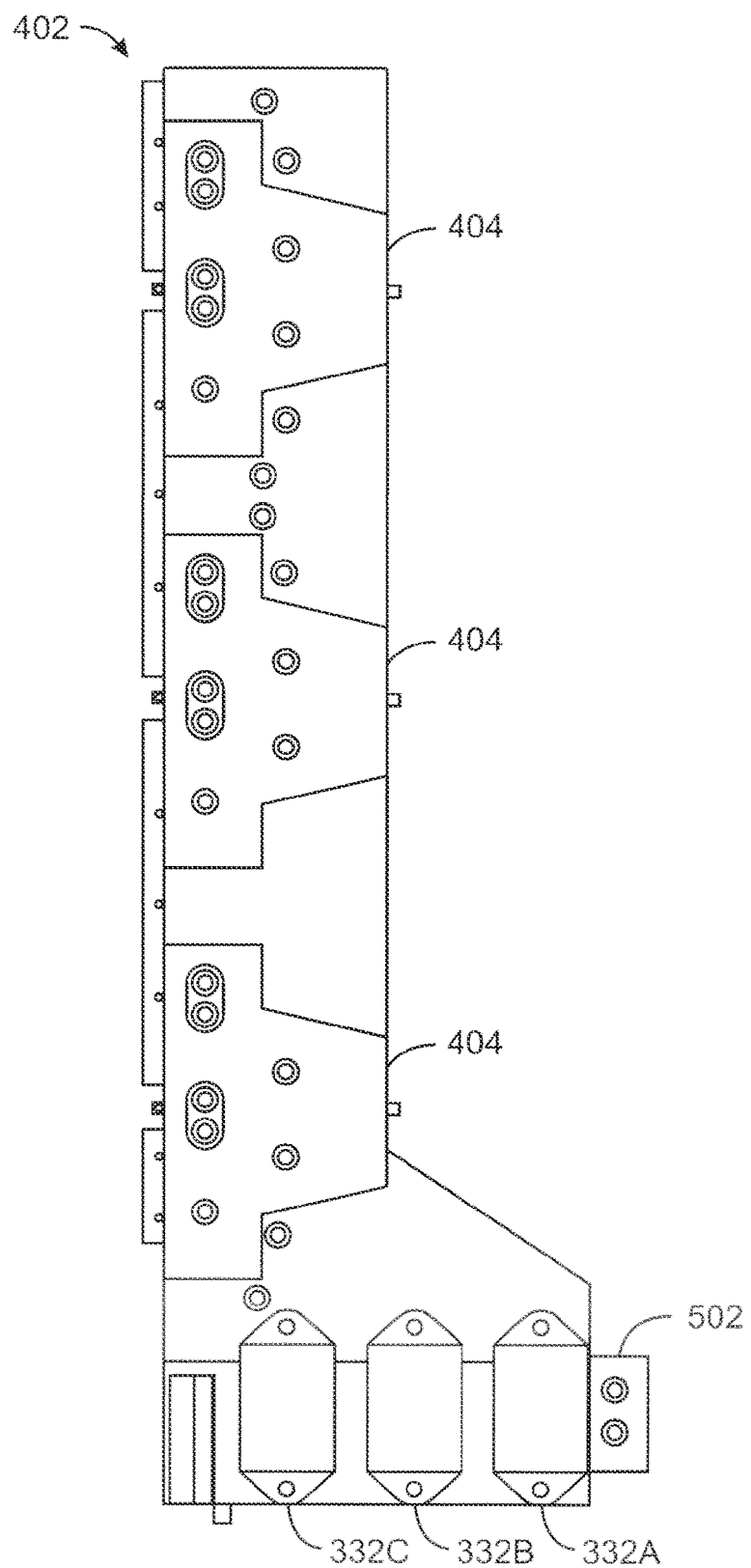
FIG. 5 is a diagram showing a side view of a laminated bus bar of a power conversion system in accordance with embodiments.

FIG. 5 is a diagram showing a side view of a laminated bus bar 402 of a power conversion system in accordance with embodiments. The laminated bus bar 402 (FIG. 4) may be connected to a DC negative inlet 502 and contain phase islands 404 (FIG. 4) that correspond to each phase used to supply power to a three-phase motor. The laminated bus bar 402 and the phase islands 404 are further displayed in FIG. 5. For ease of description, one side of the bus bar is shown, and it is understood that there are various connections and terminals not displayed on the laminated bus bar 402. The laminated bus bar 402 includes three fuses 332A, 332B, and 332C located below the phase islands 404 that correspond to the fuses 332 of FIG. 3.

During high current faults, there is an asymmetrical current flow through fuses 332A, 332B, and 332C from the DC negative inlet 502. Accordingly, more current flows between the DC negative inlet 502 and the fuse 332A located closest to the DC negative inlet 502 in the asymmetrical current flow. This is an immediate result of the particular fuse 332A being closest to the DC negative inlet 502. Similarly, more current flows through the middle fuse 332B when compared to fuse 332C located the farthest from DC negative inlet 502. Thus, any transient current from the power conversion system "cascades" through the fuses 332A, 332B, and 332C. Transient current is a short-lived or fleeting surge in current within an electrical circuit in response to a stimulus or change in the equilibrium of the circuit in the event of a fault or failure. If the transient current exceeds the current rating across the fuses 332A, 332B, and 332C, then the fuses 332A, 332B, and 332C will blow, thereby protecting the remainder of the circuit.

The fuses 332A, 332B, and 332C in parallel allows for removal of vertical laminated bus bar layers as the location of the fuses is at the front of the bus bar and off of the phase islands, thereby reducing the size of the power conversion system. The parallel fuse system also protects the inverter against laminated bus bar faults. As current passes through the fuses 332A, 332B, and 332C, each fuse has some inductance associated with it. Inductance may be measured by the ratio of the voltage within the fuse to the rate of change of the current across the fuse. The relative positions of the fuses in relation to the flow of current through the laminated bus bar results in an asymmetrical current flow across the fuses. As a result of positioning the fuses in parallel with asymmetry in the current path of the input, the resulting combined melting $I^2t$ of the parallel fuse system is reduced.

In embodiments, each of the fuses 332A, 332B, and 332C has the same current rating. Thus, when transient current in excess of the fuse rating flows through the circuit, the fuses 332A, 332B, and 332C will blow in a cascaded manner. Additionally, the parallel fuse system is disposed at the DC inlet instead of having a set of fuses for each phase of a multi-phase motor. Since the parallel fuse system is connected in series at the DC inlet, fewer fuses may be used per inverter. Thus, in embodiments, the parallel fuse system provides protection to the inverter power electronic components with a fewer number of fuses.

In embodiments, the parallel fuse system is connected directly to a switch input. Further, in embodiments the parallel fuse system may include three fuses in parallel for transient fault protection. In other embodiments, the power conversion system includes only the three fuses. Another embodiment of the invention may provide sufficient steady state balancing for the fuses for current sharing across the bus bar. As a result, the parallel fuse system may provide a means of balancing the current in the bus bar to provide uniform current density on a particular bus bar layer. Additionally, in embodiments, a higher resistance fuse could be used in the parallel fuse system and placed closest to the DC input at the location of fuse 332A to increase current along the back side of the bus bar.

In embodiments where the parallel fuse system is configured for an inductance imbalance between the fuses, inductances in each fuse leg (fuse leg referring to a fuse and portion of the electrical connections between the fuse and other elements that is unique to the fuse) may range from 1 nH to 5 nH, with the smallest inductance as between the two or more fuse legs being ⅓ (~33%) of the maximum inductance of the two or more fuse legs. In other embodiments, the inductance imbalance may include two of the fuse legs having the same or approximately the same inductance, and the third fuse leg having a smaller inductance (e.g., ⅓ or 33%). In other embodiments, the inductance imbalance may comprise a first fuse leg having a first, maximum inductance as between the two or more fuse legs, and a second fuse leg having a second, minimum inductance as between the two or more fuse legs, where the maximum inductance is greater than the minimum inductance. In other embodiments, the power conversion system (or vehicle including the power conversion system) is specifically outfitted in terms of circuit configuration/elements for realizing the inductance imbalance.

An embodiment relates to a power conversion system comprising a bus bar (e.g., a laminated bus bar), a switch coupled to the bus bar and configured to receive a DC input voltage from a voltage source through the bus bar, and a parallel fuse system disposed on the bus bar in series with the voltage source and the switch. (The switch may be one of a plurality of the switches of the power conversion system.) The parallel fuse system comprises two or more parallel fuses. The parallel fuse system is configured for an asymmetric flow of currents through the fuses when the power conversion system is in operation. For example, for the asymmetric flow of currents through the fuses, the parallel fuse system may be configured such that the two or more parallel fuses are positioned asymmetrically with regard to a shortest conductive path from the voltage source to the switch.

Another embodiment relates to a power conversion system comprising a bus bar (e.g., a laminated bus bar), a switch coupled to the bus bar and configured to receive a DC input voltage from a voltage source through the bus bar, and a parallel fuse system disposed on the bus bar in series with the voltage source and the switch. The parallel fuse system comprises two or more parallel fuses. The parallel fuse system is configured for an inductance imbalance between the fuses during operation of the power conversion system. For example, the two or more parallel fuses may be positioned asymmetrically with regard to a shortest conductive path from the voltage source to the switch.

In another embodiment, the parallel fuse system is connected directly to a switch input of the switch.

In another embodiment, an amount of energy required to melt the fuses during a short circuit resulting from a failure is lower relative to the same fuses being in a configuration other than the parallel fuse system.

In another embodiment, the parallel fuse system is configured to protect the switch against bus bar faults.

Another embodiment relates to a vehicle comprising a power conversion system as described herein.

In another embodiment of a vehicle, the parallel fuse system is located below the switch, relative to at least when the vehicle is in contact with a level surface for motive operation of the vehicle.

In another embodiment of a vehicle, the parallel fuse system is connected directly to a switch input of the switch.

In another embodiment of a vehicle, the bus bar is a laminated bus bar.

In another embodiment of a vehicle, an amount of energy required to melt the fuses during a short circuit resulting from a failure is lower relative to the same fuses being in a configuration other than the parallel fuse system.

In another embodiment of a vehicle, the parallel fuse system is configured to protect the switch against bus bar faults.

In another embodiment of a vehicle, the two or more parallel fuses are positioned asymmetrically with regard to a shortest conductive path from the voltage source to the switch.

In another embodiment of a vehicle, the fuses of the parallel fuse system are located to provide isolation of the switch in the event of a fault.

In another embodiment of a vehicle, the switch is one of plural switches of a power converter of the vehicle.

Another embodiment relates to a vehicle comprising a bus bar (e.g., a laminated bus bar), a power converter comprising plural switches (at least some of the switches are coupled to the bus bar), and a parallel fuse system disposed on the bus bar and comprising two or more fuses in parallel. The parallel fuse system is electrically connected in series with the power converter and a power source. The fuses of the parallel fuse system are located below and laterally offset from the plural switches, such that debris from the switches, if falling vertically downwards, does not encounter the fuses, and debris from the fuses, if falling downwards, does not encounter the switches, relative to at least when the vehicle is in contact with a level surface for motive operation of the vehicle.

Another embodiment relates to a power conversion system. The power conversion system comprises a power converter comprising six switches, which include three upper switches coupled to a first bus bar and three lower switches coupled to a second bus bar. The three upper switches are configured to receive a DC positive input voltage from a voltage source through the first bus bar, and the three lower switches are configured to receive a DC negative input voltage from the voltage source through the second bus bar. The power conversion system further comprises a parallel fuse system disposed on the first bus bar or the second bus bar, electrically connected in series with the voltage source and the six switches. The parallel fuse system comprises three parallel fuses. The parallel fuse system is configured for an asymmetric flow of currents through the fuses when the power conversion system is in operation.

Another embodiment relates to a power conversion system. The power conversion system comprises a power converter comprising six switches, which include three upper switches coupled to a first bus bar and three lower switches coupled to a second bus bar. The three upper switches are configured to receive a DC positive input voltage from a voltage source through the first bus bar, and the three lower switches are configured to receive a DC negative input voltage from the voltage source through the second bus bar. The power conversion system further comprises a parallel fuse system disposed on the first bus bar or the second bus bar, electrically connected in series with the voltage source and the six switches. The parallel fuse system comprises three parallel fuses. The parallel fuse system is configured for an inductance imbalance between the parallel fuses during operation of the power converter. For example, the parallel fuses may be positioned asymmetrically with regard to a shortest conductive path from the voltage source to the switches.

In another embodiment of the vehicle, the first bus bar and the second bus bar are positioned vertically, with the three upper switches coupled to the first bus bar such that the three upper switches are positioned along the length of the first bus bar from top to bottom, and the three lower switches coupled to the second bus bar such that the three lower switches are positioned along the length of the second bus bar from top to bottom. The parallel fuse system is disposed below the three upper switches on the first bus bar or the three lower switches on the second bus bar relative to at least when the vehicle is in contact with a level surface for motive operation of the vehicle.

In another embodiment of the vehicle, the parallel fuse system is connected directly to a switch input of the six switches.

In another embodiment of the vehicle, an amount of energy required to melt the fuses of the parallel fuse system during a short circuit resulting from a failure is lower relative to the same fuses being in a configuration other than the parallel fuse system.

In another embodiment of the vehicle, the first bus bar is a first laminated bus bar and the second bus bar is a second laminated bus bar.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to illustrate embodiments of the invention, they are by no means limiting and are exemplary in nature. Other embodiments may be apparent upon reviewing the above description.

In the appended claims, the terms "including" and "in which" are used as the plain-English equivalents of the respective terms "comprising" and "wherein." Moreover, in the following claims, the terms "first," "second," "third," "upper," "lower," "bottom," "top," "up," "down," etc. are used merely as labels, and are not intended to impose numerical or positional requirements on their objects.

As used herein, an element or step recited in the singular and proceeded with the word "a" or "an" should be understood as not excluding plural of said elements or steps, unless such exclusion is explicitly stated. Furthermore, references to "one embodiment" of the invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described inverter and power system with fuse protection, without departing from the spirit and scope of the invention herein involved, it is intended that all of the subject matter of the above description or shown in the accompanying drawings shall be interpreted merely as examples illustrating the inventive concept herein and shall not be construed as limiting the invention.

The invention claimed is:

1. A power conversion system, comprising:
    a bus bar;
    a switch coupled to the bus bar and configured to receive a DC input voltage from a voltage source through the bus bar; and
    a parallel fuse system disposed on the bus bar in series with the voltage source and the switch, the parallel fuse system comprising two or more parallel fuses, wherein the parallel fuse system is configured for an inductance imbalance between the fuses during operation of the power conversion system.

2. The system of claim 1, wherein the two or more parallel fuses are positioned asymmetrically with regard to a shortest conductive path from the voltage source to the switch.

3. The system of claim 1, wherein the parallel fuse system is connected directly to a switch input of the switch.

4. The system of claim 1, wherein the bus bar is a laminated bus bar.

5. The system of claim 1, wherein an amount of energy required to melt the fuses during a short circuit resulting from a failure is lower relative to the same fuses being in a configuration other than the parallel fuse system.

6. The system of claim 1, wherein the parallel fuse system is configured to protect the switch against bus bar faults.

7. A vehicle comprising:
    the power conversion system of claim 1.

8. The vehicle of claim 7, wherein the parallel fuse system is located below the switch, relative to at least when the vehicle is in contact with a level surface for motive operation of the vehicle.

9. The vehicle of claim 7, wherein the parallel fuse system is connected directly to a switch input of the switch.

10. The vehicle of claim 7, wherein the bus bar is a laminated bus bar.

11. The vehicle of claim 7, wherein an amount of energy required to melt the fuses during a short circuit resulting from a failure is lower relative to the same fuses being in a configuration other than the parallel fuse system.

12. The vehicle of claim 7, wherein the parallel fuse system is configured to protect the switch against bus bar faults.

13. The vehicle of claim 7, wherein the two or more parallel fuses are positioned asymmetrically with regard to a shortest conductive path from the voltage source to the switch.

14. The vehicle of claim 7, wherein the fuses of the parallel fuse system are located to provide isolation of the switch in the event of a fault.

15. The vehicle of claim 7, wherein the switch is one of plural switches of a power converter of the vehicle.

16. A vehicle comprising:
    a bus bar;
    a power converter comprising plural switches, wherein at least some of the switches are coupled to the bus bar; and
    a parallel fuse system disposed on the bus bar and comprising two or more fuses in parallel, wherein the parallel fuse system is electrically connected in series with the power converter and a power source, and wherein the fuses of the parallel fuse system are located below and laterally offset from the plural switches, such that debris from the switches, if falling vertically downwards, does not encounter the fuses, and debris from the fuses, if falling downwards, does not encounter the switches, relative to at least when the vehicle is in contact with a level surface for motive operation of the vehicle.

17. A power conversion system comprising:
    a power converter comprising six switches, the six switches comprising three upper switches coupled to a first bus bar and three lower switches coupled to a second bus bar, wherein the three upper switches coupled to the first bus bar are configured to receive a DC positive input voltage from a voltage source through the first bus bar and the three lower switches coupled to the second bus bar are configured to receive a DC negative input voltage from the voltage source through the second bus bar; and
    a parallel fuse system disposed on the first bus bar or the second bus bar, electrically connected in series with the voltage source and the six switches, the parallel fuse system comprising three parallel fuses, wherein the parallel fuse system is configured for an inductance imbalance between the parallel fuses during operation of the power converter.

18. The system of claim 17, wherein the parallel fuses are positioned asymmetrically with regard to a shortest conductive path from the voltage source to the switches.

19. A vehicle comprising:
    the power conversion system of claim 17, wherein the first bus bar and the second bus bar are positioned vertically, with the three upper switches coupled to the first bus bar such that the three upper switches are positioned along the length of the first bus bar from top to bottom, and the three lower switches coupled to the second bus bar such that the three lower switches are positioned along the length of the second bus bar from top to bottom, and the parallel fuse system is disposed below the three upper switches on the first bus bar or the three lower switches on the second bus bar relative to at least when the vehicle is in contact with a level surface for motive operation of the vehicle.

20. The power conversion system of claim 17, wherein the parallel fuse system is connected directly to a switch input of the six switches.

21. The power conversion system of claim 17, wherein an amount of energy required to melt the fuses of the parallel fuse system during a short circuit resulting from a failure is lower relative to the same fuses being in a configuration other than the parallel fuse system.

22. The power conversion system of claim 17, wherein the first bus bar is a first laminated bus bar and the second bus bar is a second laminated bus bar.

* * * * *